United States Patent
Kielsznia (10) Patent No.: US 8,769,163 B2
(45) Date of Patent: Jul. 1, 2014

(54) METHOD AND APPARATUS FOR CONTROLLING OPERATING CONDITIONS OF A PERIPHERAL DEVICE BASED ON MODE OF INTERCONNECTION

(75) Inventor: Jean Philippe Kielsznia, Redwood City, CA (US)

(73) Assignee: NETGEAR, Inc., San Jose, CA (US)

( * ) Notice: Subject to any disclaimer, the term of this patent is extended or adjusted under 35 U.S.C. 154(b) by 234 days.

(21) Appl. No.: 12/732,252

(22) Filed: Mar. 26, 2010

(65) Prior Publication Data
US 2010/0250790 A1 Sep. 30, 2010

Related U.S. Application Data

(60) Provisional application No. 61/163,823, filed on Mar. 26, 2009.

(51) Int. Cl.
| | |
|---|---|
| G06F 3/00 | (2006.01) |
| G06F 13/12 | (2006.01) |
| G06F 13/14 | (2006.01) |
| G06F 13/20 | (2006.01) |
| G06F 13/36 | (2006.01) |
| G06F 1/00 | (2006.01) |
| G06K 7/06 | (2006.01) |

(52) U.S. Cl.
USPC ........ 710/17; 710/1; 710/15; 710/63; 710/73; 710/301; 710/302; 710/305; 710/313; 710/315; 713/300; 713/340; 235/441

(58) Field of Classification Search
USPC ............ 710/1, 17, 73–74, 301–302, 315, 63, 710/305, 15, 313; 713/300, 322, 340; 235/441
See application file for complete search history.

(56) References Cited

U.S. PATENT DOCUMENTS

| | | | | |
|---|---|---|---|---|
| 6,149,319 | A * | 11/2000 | Richter et al. | 713/300 |
| 6,558,201 | B1 * | 5/2003 | Begley et al. | 439/638 |
| 6,763,408 | B1 * | 7/2004 | Sonoda | 710/73 |
| 6,938,108 | B2 * | 8/2005 | Ohie et al. | 710/63 |
| 7,039,821 | B1 * | 5/2006 | Potega | 713/340 |
| 7,059,913 | B1 | 6/2006 | Chen | |
| 7,254,664 | B2 * | 8/2007 | Hsieh | 710/315 |
| 7,447,437 | B2 * | 11/2008 | Schunk | 398/135 |
| 7,519,756 | B2 * | 4/2009 | Yamamoto et al. | 710/302 |
| 7,779,184 | B2 * | 8/2010 | Hubert et al. | 710/74 |
| 7,886,104 | B2 * | 2/2011 | Lai et al. | 710/301 |
| 8,271,714 | B2 * | 9/2012 | Ede | 710/305 |
| 2002/0040444 | A1 * | 4/2002 | Ohie et al. | 713/322 |
| 2003/0154326 | A1 * | 8/2003 | Tseng et al. | 710/1 |
| 2003/0188205 | A1 * | 10/2003 | Mylly | 713/300 |

(Continued)

*Primary Examiner* — Farley Abad
*Assistant Examiner* — Henry Yu
(74) *Attorney, Agent, or Firm* — Boyle Fredrickson, S.C.

(57) ABSTRACT

The present invention provides a method and apparatus for controlling the operating condition of a peripheral device based on the mode of interconnection of the peripheral device of a host device. The apparatus includes a first connector for connecting the peripheral device, a second connector for connecting the host device and a coupling system operatively interconnecting contacts of the first connector and contacts of the second connector. The coupling system is further configured to provide a supply signal to the peripheral device via the first connector, wherein the supply signal is at least in part indicative of one or more characteristics of the power available to the peripheral device from the host device. The supply signal may provide a means for the peripheral device to control operation thereof in light of the characteristics of the power available.

17 Claims, 6 Drawing Sheets

(56) References Cited

U.S. PATENT DOCUMENTS

| | | | |
|---|---|---|---|
| 2005/0154930 A1* | 7/2005 | Morrow | 713/300 |
| 2006/0243801 A1* | 11/2006 | Chen | 235/441 |
| 2008/0168204 A1* | 7/2008 | Sultenfuss et al. | 710/301 |
| 2008/0229121 A1* | 9/2008 | Lassa et al. | 713/300 |

\* cited by examiner

| \multicolumn{3}{c}{ExpressCard™ Connector Pin Out} |
|---|---|---|
| Pin # | Signal Name | Pin Function |
| 1 | GND | Ground, Return current path |
| 2 | No Data | -- |
| 3 | No Data | -- |
| 4 | No Data | -- |
| 5 | No Data | -- |
| 6 | No Data | -- |
| 7 | No Data | -- |
| 8 | No Data | -- |
| 9 | No Data | -- |
| 10 | No Data | -- |
| 11 | WAKE # | Request the host interface return to full operation |
| 12 | +3.3VAUX | Power, Auxiliary voltage source |
| 13 | PERST# | PCIe Reset |
| 14 | +3.3V | Power |
| 15 | +3.3V | Power |
| 16 | CLKREQ# | Request that REFCLK be enabled |
| 17 | GND | Ground, Return current path |
| 18 | REFCLK- | PCI Express reference clock |
| 19 | REFCLK+ | PCI Express reference clock |
| 20 | GND | Ground, Return current path |
| 21 | PER0- | PCI Express x1 interface, Input/Output |
| 22 | PER0+ | PCI Express x1 interface, Input/Output |
| 23 | GND | Ground, Return current path |
| 24 | PET0- | PCI Express x1 interface, Input/Output |
| 25 | PET0+ | PCI Express x1 interface, Input/Output |
| 26 | GND | Ground, Return current path |

METHOD AND APPARATUS FOR CONTROLLING OPERATING CONDITIONS OF A PERIPHERAL DEVICE BASED ON MODE OF INTERCONNECTION

FIELD OF THE INVENTION

The present invention pertains in general to control of operating conditions of a peripheral device and in particular to control of operating conditions of a peripheral device based on mode of interconnection.

BACKGROUND

There are a variety of different interfaces for connecting peripheral devices to a host device such as a personal computer (PC), general purpose computer, notebook, laptop, handheld or tablet. PC, for example. ExpressCard™ and its predecessor the PC Card™ interface, both standardized by the Personal Computer Memory Card International Association (PCMCIA) have been employed for interconnecting peripheral devices, for example, for wireless modems, hard disk or solid-state drives, memory or memory card readers, interface adapter cards, tuners or other peripheral devices, to a host device.

The ExpressCard™ interface is physically different from its predecessor, the PC Card™ interface, and has different electrical supply voltage and current limitations. The ExpressCard™ interface standard defines that up to 1.2 A can be provided or drawn at 3.3 V, whereas a PC Card™ compliant device can provide 1.0 A at 3.3 V. ExpressCard™ and PC Card™ standards, furthermore, allow the supply voltage to vary typically between 3.0 V and 3.6 V.

Figure 1:
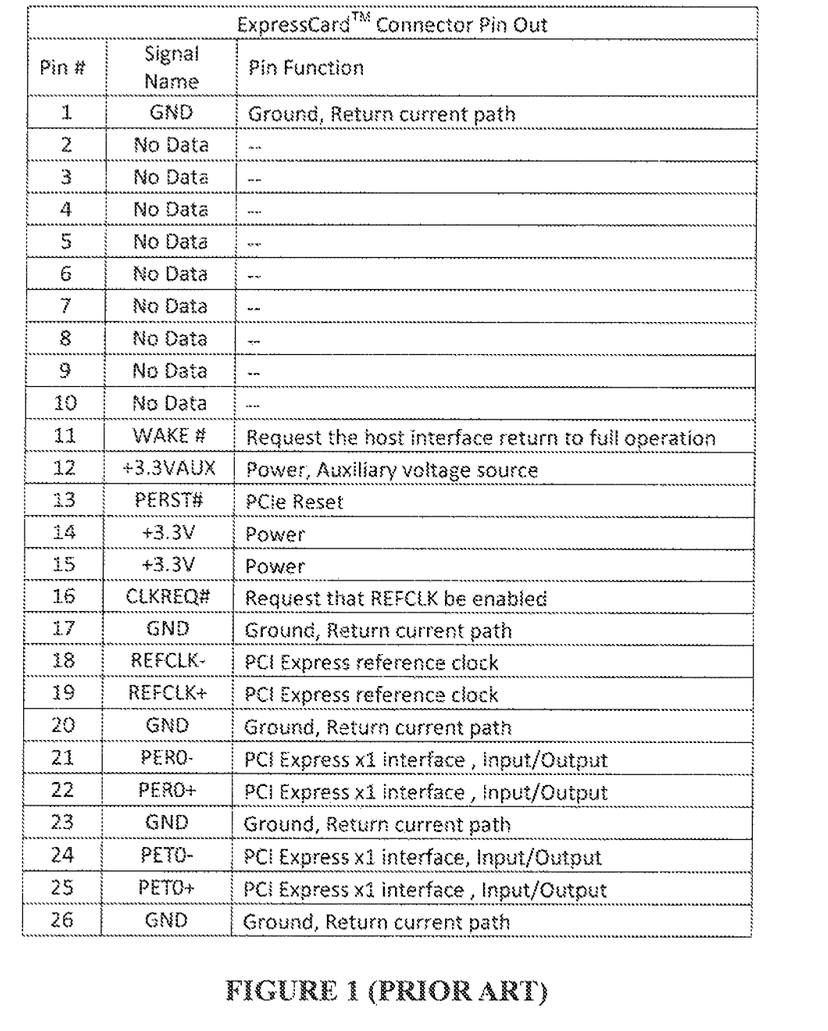
FIG. 1 illustrates a table of pin signal assignments for an ExpressCard™ according to the prior art.

The PC Card™ interface uses a connection to parallel buses including the Industry Standard Architecture (ISA) 16-bit interface or the Peripheral Component Interconnect (PCI) interface, also known in the art as CardBus. The ExpressCard™ interface, however, can use the PCI Express or Universal Serial Bus (USB) serial interfaces. The PC Card™ interface uses a 68-contact pin and socket connector, while the ExpressCard™ interface utilizes a 26-contact beam on blade connector. For example, FIG. 1 illustrates a Pin Out diagram for a prior art ExpressCard™ interface. Because of the nature of the interfaces, signal exchange between PC Card™ and ExpressCard™ interfaces requires at least some form of signal conversion.

Devices, often referred to as adaptors or converters, for connecting peripheral devices with ExpressCard™ interfaces to a host device with a PC Card™ interface are available. However, peripheral devices with an ExpressCard™ interface may draw more than 1.0 A and may therefore, when used with a converter, overload the power supply capabilities of a PC Card™ host interface. This problem may be further aggravated by peripheral devices that stabilize input supply voltage, for example, by using, a switching power converter or inline voltage stabilizer, which in turn may increase the current drawn from the host device in response to a drop in the supply voltage. If the supply current exceeds a predetermined limit, the host device may limit the voltage and/or current supplied to the peripheral device, which may compromise the functionality of the peripheral device, or the host device may drop power supply to the peripheral device completely.

Therefore there is a need for a solution that overcomes one or more of the deficiencies in the art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for controlling operating conditions of a peripheral device based on mode of interconnection. According to an aspect of the present, invention there is provided a coupling apparatus for interconnecting a peripheral device and a host device, the coupling apparatus comprising: a first connector configured for operative connection with the peripheral device; a second connector configured for operative connection with the host device; and a coupling system operatively interconnecting the first connector and the second connector, the coupling system configured to provide a supply signal to the peripheral device via the first connector, the supply signal at least in part indicative of one or more characteristics of power available to the peripheral device from the host device.

According to another aspect of the present invention there is provided a peripheral device comprising: a connector comprising a plurality of contacts, wherein one or more of said plurality of contacts are configured to receive a supply signal; and a control system operatively associated with the connector, the control system configured to shift the peripheral device into an operating condition determined in accordance with the supply signal.

According to another aspect of the present invention there is provided a method for controlling a peripheral device, the method comprising: sensing a supply signal at a predetermined contact of a connector of the peripheral device, the supply signal at least in part indicative of one or more characteristics of power available to the peripheral device; determining an operating condition in accordance with the supply voltage; and shifting the peripheral device into the operating condition.

DETAILED DESCRIPTION OF THE INVENTION

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

There are a variety of different interfaces to a host device, such as a personal computer (PC), general purpose computer, notebook, laptop, handheld or tablet PC, for example, that can be used for interconnection with a peripheral device. For example, there may be a smaller Express Card™ slot or a larger PC Card™ slot, among other interface configurations. Each of these interface configurations typically has its own electrical power limitations. In order to provide and/or facilitate use of a peripheral device that can be operative in association with two or more different interface configurations, a means for physically adapting to each interface in an operative form and also means to adapt to the different power supply capabilities can be required.

Using a coupling apparatus which is capable of interconnecting a peripheral device having a first type of interface to a host device with a different type of interface may be desirable to users for a number of reasons. For example, a coupling apparatus of this type can enable use of a peripheral device in association with host devices that do not themselves provide the required interface for that peripheral device. Effective operation of a peripheral device via a coupling apparatus to an interface other than the interface built into the peripheral device, however, may add complexity to the design of the coupling apparatus and the peripheral device. For example, because of the higher supply current limit, peripheral devices with an ExpressCard™ interface may exceed the supply current limits of the PC Card™ interface. This situation may occur, in general, in other interface combinations of interfaces and is not limited to operating ExpressCard™ peripheral devices with a coupling apparatus on PC Card™ interfaces. It is noted that coupling apparatus with other interface combinations are to be included in the overall scope of the present disclosure.

According to embodiments of the invention, in order to effectively operate a peripheral device with one type of interface on a host device with another interface with lesser power supply capability, the two interfaces should be operatively interconnected, signals of different formats, if any, should be converted, and power consumption of the peripheral device should be made to comply with the host device interface power supply specifications. Operative interconnection may comprise mechanical interconnection electrical interconnection and/or other interconnection, for example optical interconnection of signals, interconnection through electrical components such as transformers, capacitors, inductors, autotransformers, or a combination thereof, or the like. In some embodiments, operative interconnection comprises operative connection of power-carrying conductors, operative connection of signal-carrying conductors, or a combination thereof.

The present invention provides a method and apparatus for controlling the operating condition of a peripheral device based on its mode of interconnection to a host device. In some embodiments, there is provided a coupling apparatus for interconnecting a peripheral device and a host device. The coupling apparatus comprises a first connector, such as an Express Card™ connector, for connection to the peripheral device, and a second connector, such as a PC Card™ connector, for connection to the host device. The coupling apparatus further comprises a coupling system operatively interconnecting the first connector and the second connector. The coupling system may facilitate passing of signals between the host device and the peripheral device and/or providing power from the host device to the peripheral device. The coupling system is configured to provide a supply signal to the peripheral device via the first connector, wherein the supply signal is at least in part indicative of one or more characteristics of power available to the peripheral device from the host device. In some embodiments, the coupling system may comprise one or more electronic components such as logic gates or arrays, voltage or current sensors or comparators, amplifiers, resistors, capacitors, inductors, transformers, microprocessors, or the like.

In some embodiments, in addition to operating as an adaptor or converter, the coupling apparatus is configured to provide an indication of conditions of available supply power to a peripheral device operatively coupled thereto, wherein the supply power is provided by a host device operatively coupled to the coupling apparatus. For example, the coupling system may be configured to provide a supply signal, to a peripheral device operatively coupled thereto, wherein the supply signal is indicative that power is being supplied from a host device via a certain type of interface, and hence indicate that supply power, voltage and/or current are limited to a maximum value corresponding to that interface type.

In some embodiments, the supply signal is selected from a binary alternative, for example, a first supply signal indicates connection to the host device using a connection apparatus and second signal indicates direct connection to the host device. A supply signal can also be selected from a plurality of different signals, wherein each of the plurality of supply signals is uniquely representative of particular connection and/or power supply conditions. In some embodiments, a supply signal can be configured as a voltage signal, which is constant over time or varying over time. In some embodiments, the supply signal can be an encoded signal, for example using pulse width modulation, pulse code modulation or other coding format.

In some embodiments, the coupling system may be configured to determine supply power availability by: monitoring conditions at one or more contacts of the second connector (coupled to the host device), and processing said monitored conditions. The coupling system may then provide a supply signal to the peripheral device, based on said monitored conditions, indicative of supply power availability. Monitoring, processing and signalling may comprise use of one or more digital and/or analog electronic components. In some embodiments, the supply signal may be configured as a voltage representative of a logical one or zero from a contact of the host interface to a predetermined contact of the peripheral interface, or the like. The supply signal may be provided via a contact of the first connector (coupled to the peripheral device), for example by driving that contact of the first connector to exhibit a voltage indicative of supply power availability, which may then be detected by the peripheral device. In some embodiments, this contact of the first connector may be an unused contact or for example a spare contact based on the PCMCIA interface standard. Using an unused or spare contact may enable the coupling apparatus to be substantially "transparent" to some peripheral devices which are not configured to use the spare contact. Using a spare contact may enable design and implementation of peripheral devices in accordance with embodiments of the present invention, to receive and react to said supply power availability signal provided by the coupling system, while avoiding substantial disruption of other peripheral device operations as supported by other contacts of the first connector not deemed as unused or spare contacts.

In some embodiments, there is provided a peripheral device comprising: a connector including a plurality of contacts, for example, for coupling with the first connector of the coupling apparatus, or with a mating connector of a host device; and a control system operatively associated with the connector. The control system is configured to shift the peripheral device into an operating condition determined in accordance with a supply signal detected on a predetermined contact. The peripheral device may be configured to be operable with the coupling apparatus, for example by detecting, via the supply signal on the predetermined contact, that this supply signal is indicative of supply power availability conditions. The control system of the peripheral device may be configured to shift the peripheral device into an appropriate operating condition based on the supply signal indicative of supply power availability conditions. For example, the appropriate operating condition may be configured so as to limit power, voltage, and/or current draw by the peripheral device so as not to exceed a predetermined maximum. The peripheral device may also be configured to be operable directly with a host device, provided the host device has a mating connector corresponding to the connector of the peripheral device. In the case of direct connection between the peripheral device and host device, the control system may be configured to detect such a direct connection and shift the peripheral device into an appropriate operating condition, for example based on one or more inferences about power availability via the direct connection.

In some embodiments, there is provided a method for controlling a peripheral device, the method comprising: sensing a supply signal, said supply signal configured as a contact voltage of a predetermined contact of a connector of the peripheral device; determining an operating condition in accordance with the contact voltage; and shifting the peripheral device into the operating condition.

Figure 2:
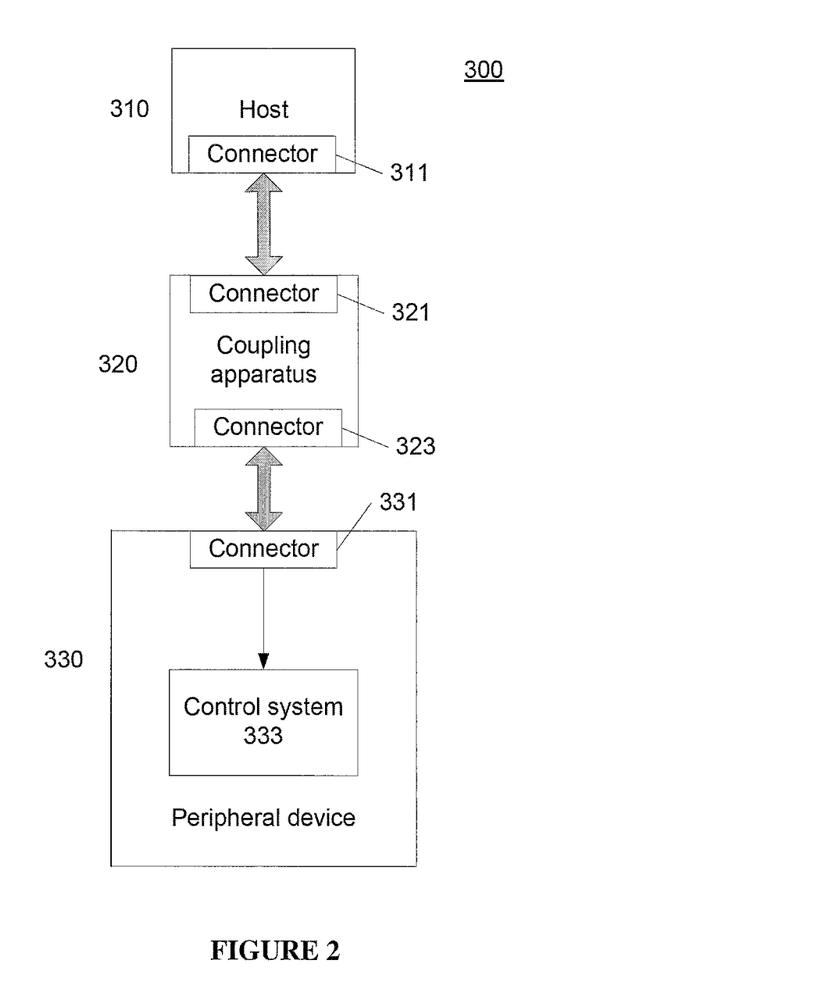
FIG. 2 illustrates a block diagram of a system including a peripheral device, coupling apparatus and host device according to embodiments of the invention.

FIG. 2 illustrates a block diagram of a system 300 including a peripheral device 330, coupling apparatus 320 and a host device 310 according to embodiments of the present invention. The peripheral device 330 comprises a connector 331 having a first interface configuration and the host device 310 comprises a connector 311 having a second interface configuration. The coupling apparatus 320 comprises a first connector 323 and a second connector 321. The first connector 323 is configured in accordance with the first interface configuration and the second connector 321 is configured in accordance with the second interface configuration. The first connector 323 of the coupling apparatus 320 and the connector 331 of the peripheral device 330 are configured so they can mutually mate with each other. Furthermore, the second connector 321 of the coupling apparatus 320 and the connector 311 of the host device 310 are configured so they can mutually mate with each other. According to embodiments of the present invention, the connectors 323 and 331, and/or 321 and 311 may be interconnected directly or through respective cables, for example. The system is further configured to provide a supply signal to the peripheral device via the first connector, wherein the supply signal is at least in part indicative of one or more characteristics of the power available to the peripheral device from the host device.

Coupling Apparatus

According to embodiments of the present invention, the coupling apparatus 320 is configured to electromechanically interconnect a peripheral device having a connector configured in accordance with a first interface configuration to a host device having a connector configured in accordance with a second interface configuration. According to embodiments, the second interface configuration can be different from the first interface configuration. The coupling apparatus 320 comprises a first connector 323 and a second connector 321 and further comprises a coupling system (not illustrated) for operatively interconnecting the first connector 323 and the second connector 321. For example, the coupling system can be configured to operatively connect certain contacts of the first connector 323 with certain contacts of the second connector 321. Depending on the signal formats of the first and second interfaces, the coupling system may directly interconnect pairs of contacts between the first and second connectors with electrically conductive pathways, employ electronic circuitry, optical circuitry, various levels of signal processing, or the like, for example. The coupling system is configured to interconnect or operatively couple predetermined contacts of the first and second connectors, for example such that only signals that are compatible with the respective peripheral device interface configuration and host device interface configuration are transmitted between the first connector 323 and the second connector 321.

The coupling system is further configured to provide a supply signal to the peripheral device via the first connector, wherein the supply signal is at least in part indicative of one or more characteristics of power available to the peripheral device from the host device. For example, the coupling system may be configured to provide one or more predetermined contacts of the first connector with a first voltage. According to an embodiment of the present invention, a predetermined contact may be a spare contact of the first connector to which no specific function or signal is assigned by the corresponding interface definition. According to an embodiment of the present invention, the first voltage may be used to indicate a mode of interconnection, for example, whether the peripheral device is connected to the host device via a coupling apparatus or connected directly to an interface of the host device. As such, the first voltage may be used by the peripheral device to distinguish between modes of interconnection.

According to an embodiment of the present invention, the supply signal is determined from one or more signals, for example voltages or other signals, on one or more contacts of the second interface. The supply signal may be determined using analog, digital or mixed forms of signal processing via adequate electronic circuitry that is operatively coupled to the predetermined contact of the first interface and the one or more contacts of the second interface that carry the one or more signals.

According to some embodiments, the coupling apparatus comprises one or more processing components, such as a microprocessor or microcontroller operatively coupled to memory such as RAM or ROM, logic circuits, amplifiers, comparators, digital-to-analog converters, analog-to-digital converters, application specific integrated circuits (ASICs), field-programmable gate arrays (FPGAs), or the like. The processing components, along with software or firmware, where appropriate, may be configured to determine the supply signal, for example, a first voltage to be supplied on a contact of the first connector, may be determined based at least in part on the one or more second voltages of one or more contacts of the second interface. For example, the first voltage may be driven by a controllable amplifier, digital-to-analog converter, or the like. The one or more second voltages may be detected by one or more voltage comparators, analog-to-digital converters, or the like. In some embodiments, processing is performed substantially by analog circuitry, such as circuitry comprising input buffers, output buffers, voltage comparators, transistors, amplifiers, resistors, capacitors, and the like.

In some embodiments, the coupling apparatus may be configured to provide a supply signal configured as a contact voltage, which can be indicative of supply power availability conditions, the supply signal being conveyed over two or more contacts of the first connector, or being time-varying, or the like. This configuration of the provision of the supply signal may provide for a greater range of signal conditions and/or a supply signal which is robust to ambiguity and/or noise. For example, for a supply signal conveyed over unused contacts, providing a time-varying signal of a predetermined type, and/or providing the supply signal via different voltages on different contacts, may facilitate discrimination, by the peripheral device, of the supply signal over lack of such a supply signal, since for example voltage conditions at unused contacts may be undefined and/or variable.

Peripheral Device

As illustrated in FIG. 2, a peripheral device 330 according to an embodiment of the present invention comprises a connector 331 and a control system 333. The control system 333 is operatively connected to the connector 331 and configured to monitor the supply signal provided at a predetermined contact of the connector 331 that corresponds to a respective contact of the coupling apparatus connector 323 providing the supply signal when mated to the coupling apparatus.

Upon interconnection of the peripheral device 330 and supply of adequate power, the peripheral device 330 enters an activation process. During activation, the peripheral device 330 determines the supply signal, for example a voltage, of the predetermined contact of the connector 331. According to an embodiment of the present invention, the control system 333 is configured to shift the peripheral device into an operating condition in correspondence with the supply signal of the predetermined contact of the connector 331.

Figure 3:
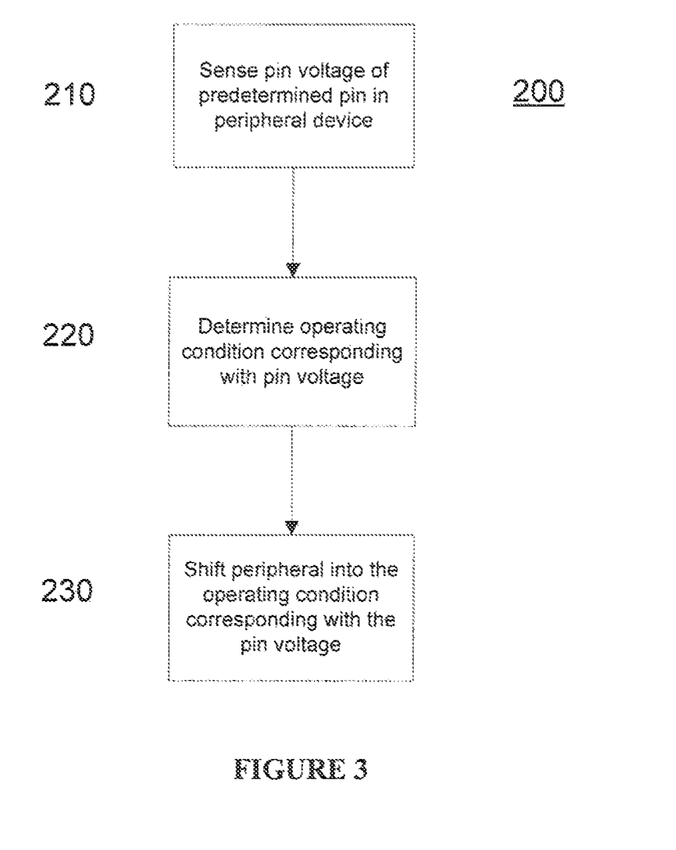
FIG. 3 illustrates a flow diagram of a method for controlling an operating condition of a peripheral device according to embodiments of the invention.

FIG. 3 illustrates a flow diagram of a method 200 for controlling a peripheral device according to an embodiment of the present invention. The method comprises steps 210, 220 and 230. Step 210 comprises sensing a supply signal, for example a pin voltage of the predetermined contact of the connector 331. Step 220 comprises determining an operating condition that corresponds with the supply signal, and step 230 comprises shifting the peripheral device 3.00 into the operating condition that corresponds with the supply signal.

According to an embodiment of the present invention, an operating condition may be selected from one or more predetermined operating conditions that may be associated with one or more predetermined supply signals, for example voltages, by one or more predetermined associations stored within an adequate memory system within the peripheral device. For example, the method for controlling the peripheral device may be configured to shift the peripheral device into an operating condition that most closely corresponds with power availability conditions indicated by the supply signal. A peripheral device may be configured to not exceed a predetermined maximum power consumption or maximum supply current, for example, as characterized by each one of the one or more predetermined operating conditions.

According to another embodiment of the present invention, the control system may be configured to control the operating conditions of one or more components of the peripheral device so that power or supply current to these components is reduced and in order to limit power and/or supply current demand of the whole peripheral device. For example, the control system may be configured to reduce the supply current to a component or instruct a component to reduce its power or supply current demand.

According to some embodiments, the peripheral control system comprises one or more analog and/or digital processing components, such as a microprocessor or microcontroller operatively coupled to memory such as RAM or ROM, logic circuits, amplifiers, comparators, digital-to-analog converters, analog-to-digital converters, application specific integrated circuits (ASICs), field-programmable gate arrays (FPGAs), or the like. The processing components, along with software or firmware, where appropriate, may be configured to determine the supply signal, for example a contact voltage, of a predetermined contact of the peripheral device and shift the peripheral device into an operating condition determined in accordance with the supply signal. According to some embodiments, the peripheral control system is at least partly integrated with other functionality of the peripheral, for example by using portions of the peripheral hardware to facilitate functionalities of both the peripheral control system and the peripheral. According to some embodiments, the peripheral control system is provided at least in part via software or firmware executed by the peripheral.

In some embodiments, the peripheral control system substantially comprises analog components. For example, the supply signal may be detected by one or more voltage comparators, analog-to-digital converters, or the like. Analog circuitry may be configured to determine an appropriate operating condition and shift the peripheral device into said operating condition. Analog circuitry may comprise input buffers, output buffers, voltage comparators, transistors, amplifiers, resistors, capacitors, and the like. For example, the circuitry may comprise a voltage comparator for determining if the supply signal is below or above a predetermined threshold and a current limiter configured to limit current drawn by the peripheral to one of two or more predetermined levels based on the output of the voltage comparator.

Figure 4:
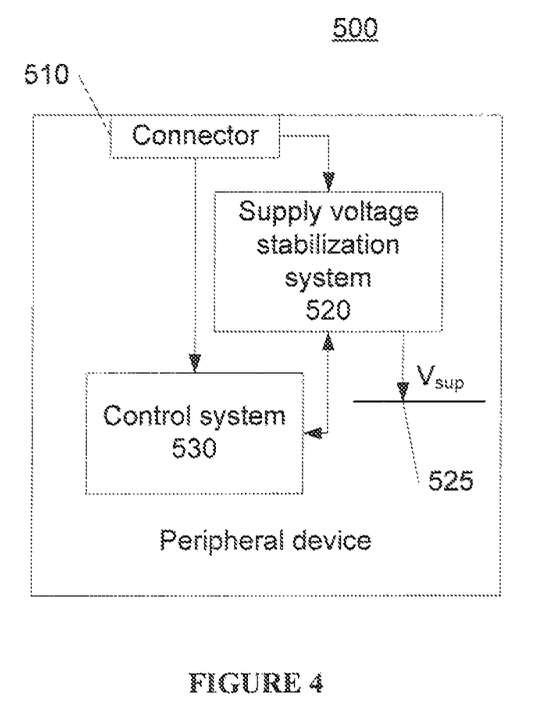
FIG. 4 illustrates a block diagram of a peripheral device according to embodiments of the invention.

According to an embodiment of the present invention and as illustrated in FIG. 4, a peripheral device 500 may comprise a supply-voltage stabilization system 520. The supply-voltage stabilization system 520 may be configured to permit configuration and/or control of power and/or supply current demand limits and the control system 530 may be configured to affect the power and/or supply current demand limits in accordance with the supply signal of a predetermined pin of the connector 510. The supply-voltage stabilization system 520 may be used to maintain a sufficiently stable internal supply voltage 525 to various components of the peripheral device 500.

For example, the supply-voltage stabilization system may comprise a switching power converter, such as a buck converter or boost converter, or other feedback or feed forward voltage stabilization system, for example. The power converter may comprise other components such as capacitors, resistors, inductors, transformers, autotransformers, or the like. The power converter may be controllable and/or programmable, for example by controlling and/or programming a switching duty cycle thereof. In some embodiments, the power converter may be configured to draw power by drawing current at a provided supply voltage. The amount of power drawn may be varied in order to maintain supply power to components of the peripheral device within a predetermined operating range, for example by maintaining supply voltage within a predetermined voltage range, and maintaining available and/or actual supply current within a predetermined current range.

The invention will now be described with reference to specific examples. It will be understood that the following examples are intended to describe embodiments of the invention and are not intended to limit the invention in any way.

EXAMPLES

Example 1

Figure 5A:
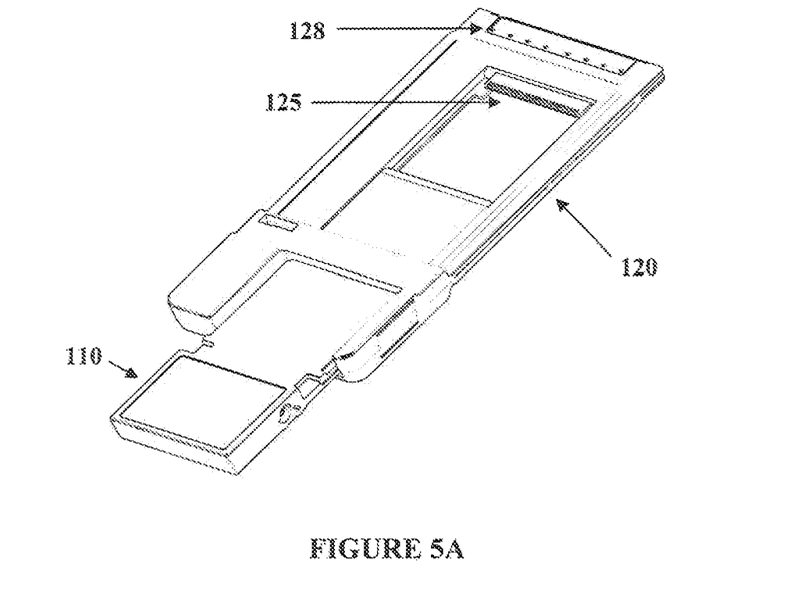
FIG. 5A illustrates a peripheral device with an ExpressCard™ interface partially mated with an ExpressCard-to-PC Card coupling apparatus according to an embodiment of the invention.
Figure 5B:
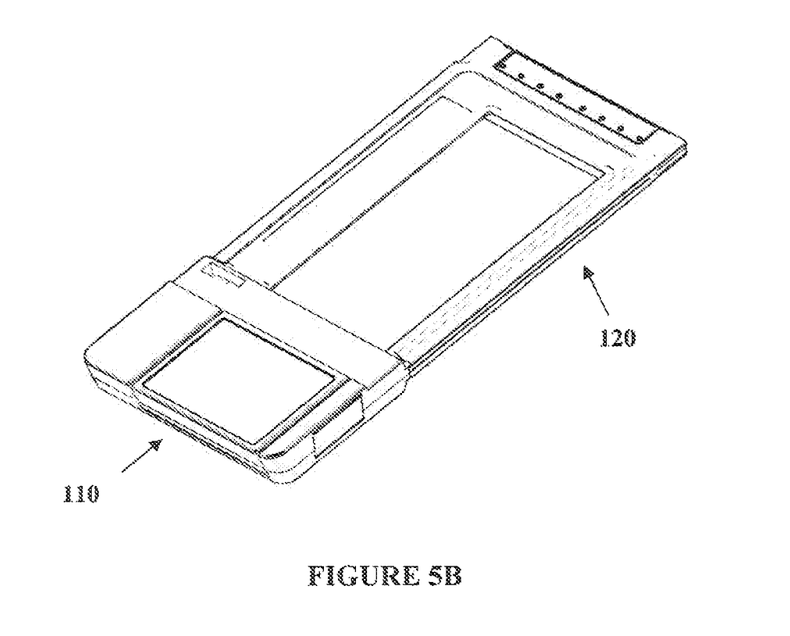
FIG. 5B illustrates the peripheral device fully mated with the ExpressCard™-to-PC Card™ coupling apparatus illustrated in FIG. 5A.

An example peripheral device 110 and coupling apparatus 120 according to an embodiment of the present invention are illustrated in FIG. 5A and FIG. 5B. The example peripheral device 110 is configured as an ExpressCard™ peripheral device. The coupling apparatus 120 is configured as an ExpressCard™-to-PC Card™ coupling apparatus 120, providing both an ExpressCard™ connector 125 for mating attachment the peripheral device 110, and a PC Card™ connector 128 for mating attachment with a host device. FIG. 5A illustrates the peripheral device 110 partially mated with a coupling apparatus 110. FIG. 5B illustrates the peripheral device 110 fully mated with the coupling apparatus 120.

The coupling apparatus 120 is configured to operatively connect to a PC Card™ slot, for example, of a notebook computer (not illustrated). According to an embodiment of the present invention, the peripheral device 110 is configured so it can comply with the supply current limit of the ExpressCard™ standard as well as that of the PC Card™ standard depending on the mode of interconnection. The ExpressCard™ 110 and coupling apparatus 120 illustrated in FIG. 5B are configured to operate in combination like a stand-alone PC Card™ in terms of supply current and/or power consumption. The coupling apparatus 120 is configured to convert some or all signals of the ExpressCard™ into signals that comply with the PC Card™ and vice versa for transmission between the two connectors.

As defined by the ExpressCard™ standard and as illustrated in FIG. 1, an ExpressCard™ connector may provide a specified number of spare contacts, for example Pin #2 to Pin #10 that have no defined use in the current version of the standard. The use definitions, if any, for the signals of the contacts of the ExpressCard™ standard, Pin #1 to Pin #26, are generally defined in the ExpressCard™ standard as published by the PCMCIA, which may be readily obtained and understood by a worker skilled in the art.

The coupling apparatus 120 may be configured to permit providing a supply signal, for example a predetermined voltage, at one or more of the spare pins of the ExpressCard™ connector when operatively coupled to an active host device. The pin can be used by the peripheral device 110 to sense if the supply signal provided at the pin matches a predetermined supply signal which can then be used by the peripheral device 110 to determine whether it is used in combination with the coupling apparatus 120 on a PC Card™ interface or directly on an ExpressCare™ interface of a host device. Based on the supply signal of the spare pin, the control system can shift the peripheral device 110 to adequate operating conditions to avoid drawing power and/or supply current in excess of the limits of the PC Card™ interface.

The ExpressCard™ modem may further include a supply-voltage stabilization system for providing a stable supply voltage to various components of the modem in order to facilitate predetermined operation of the components of the modem. The supply-voltage stabilization system may be configured as a switching power converter or other feedback or feed forward voltage stabilization system, for example. The supply-voltage stabilization system may be configured to provide programmable voltage and/or current limits for stabilizing internal supply voltage and for limiting the power and/or current supply demand of the ExpressCard™ modem. The ExpressCard™ modem may comprise a control system operatively coupled to the supply-voltage stabilization system to set the programmable voltage and/or current limits.

Example 2

Figure 6:
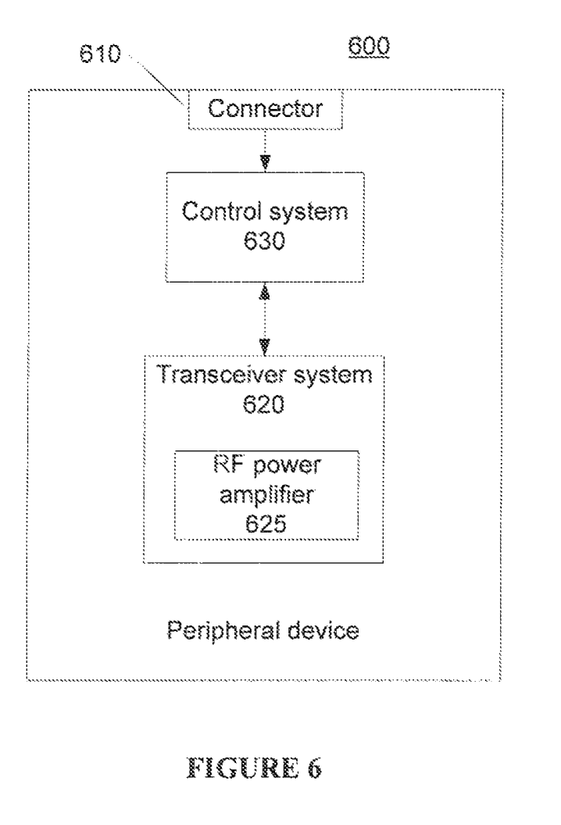
FIG. 6 illustrates a block diagram of a peripheral device according to embodiments of the invention.

Another example peripheral device according to an embodiment of the present invention is configured as a wireless cellular communication ExpressCard™ modem, for example, configured for communication via CDMA 2000 EVDO, GSM, UMTS, or other cellular communication standard. The ExpressCard™ modem can be used in combination with a corresponding coupling apparatus. The ExpressCard™ modem and the coupling apparatus may be configured as illustrated in FIG. 5A and FIG. 5B. A block diagram of the ExpressCard™ modem 600 is illustrated in FIG. 6.

The coupling apparatus may be configured to facilitate providing a predetermined supply signal, for example a predetermined voltage, on one of the spare pins of the ExpressCard™ connector. The pin can be used by the ExpressCard™ modem peripheral device to sense if the potential provided at the pin matches a predetermined voltage which can then be used by the peripheral device to determine whether it is used in combination with the coupling apparatus on a PC Care™ interface or directly on an ExpressCard™ interface of a host device. Based on voltage of the one spare pin, the control system can shift the peripheral device to adequate operating conditions to avoid drawing power and/or supply current in excess of the limits of the PC Care™ interface. In some embodiments, plural spare pins may be used to communicate available power for use by the peripheral device.

The ExpressCard™ modem 600 comprises a programmable transceiver system 620 including a radio frequency (RF) power amplifier 625 for sending and receiving electromagnetic signals and for controlling the power and/or current supply demand of the transceiver system 620 and hence the ExpressCard™ modem 600. The ExpressCard™ modem 600 further comprises a control system 630 operatively coupled to the transceiver system 620 for controlling and/or setting the power and/or current supply demand and/or the corresponding limits of the transceiver system 620. As, during transmission, the RF power amplifier may be among the components of the ExpressCard™ modem with the highest power consumption, the total power and/or supply current demand of the ExpressCard™ modem may be effectively controlled by controlling the power consumption of the RF power amplifier.

The RF power amplifier 625 is configured to provide control over its power and/or supply current demand, for example, by varying the voltage supplied to it. The control system 630 is configured to adjust and/or set an upper limit of the power and/or supply current demand of the RF power amplifier in response to the voltage of the one spare pin of the connector 610 as discussed herein. For example, the ExpressCard™ modem 600 may comprise a voltage converter (not illustrated) such as a boost converter, for controlling the supply voltage of the RF power amplifier 625 and the control system 630 may be configured to control the voltage converter.

The ExpressCard™ modem may be configured to take one or more actions when it detects that it is used in combination with the coupling apparatus in order to inhibit supply current from exceeding the PC Card™ supply current limit, which may be a lower limit than the ExpressCard™ limit. The control system may be configured to adjust the maximum supply voltage and/or control the supply voltage to the RF power amplifier to a lower voltage than when operating the ExpressCard™ without a coupling device directly on an Express Card™ interface of a host device. Lowering the supply voltage to the RF power amplifier during use of the ExpressCard™ modem in combination with the coupling apparatus can facilitate compliance of the ExpressCard™ modem with the lower power and/or supply current limits of the PC Card™ interface.

The ExpressCard™ modem may further include a supply-voltage stabilization system for providing a stable supply voltage to various components of the modem in order to facilitate adequate operation of the components of the modem. The supply-voltage stabilization system may be configured as a switching power converter or other feedback or feed forward voltage stabilization system, for example. The supply-voltage stabilization system may be configured to provide programmable voltage and/or current limits for stabilizing internal supply voltage and for limiting the power and/or current supply demand of the ExpressCare™ modem. The ExpressCard™ modem may comprise a control system operatively coupled to the supply-voltage stabilization system to set the programmable voltage and/or current limits.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. A coupling apparatus for interconnecting a peripheral device and a host device, the coupling apparatus comprising:
   a. a first connector configured for operative connection with the peripheral device via a first type of interface;
   b. a second connector configured for operative connection with the host device via a second type of interface, different from the first type of interface; and
   c. a coupling system operatively interconnecting the first connector and the second connector, the coupling system comprising processing components configured to generate a supply signal, the coupling system further configured to provide the supply signal to the peripheral device via the first connector, the supply signal indicative of presence of the coupling apparatus interconnecting the peripheral device and the host device, thereby indicating maximum supply power, maximum supply current, or both, available to the peripheral device from the host device, wherein generating the supply signal comprises monitoring conditions at one or more contacts of the second connector, processing said monitored conditions using software or firmware installed on the processing components to generate the supply signal based on the conditions received at the one or more contacts of the second connector, and providing the supply signal based on the monitored conditions,
   wherein the first connector is configured for a mechanical connection to a peripheral device connector and the second connector is configured for a mechanical connection to a host device connector.

2. The coupling apparatus of claim 1, wherein the supply signal is provided on a predetermined contact associated with the first connector, wherein the predetermined contact is an unused contact.

3. The coupling apparatus of claim 1, wherein the first connector and the second connector are configured in accordance with a Personal Computer Memory Card International Association (PCMCIA) interface standard.

4. The coupling apparatus of claim 1, wherein the supply signal is provided on a predetermined contact associated with the first connector, wherein the predetermined contact is a spare contact based on the PCMCIA interface standard.

5. The coupling apparatus of claim 3, wherein the first connector is configured in accordance with an ExpressCard interface standard.

6. The coupling apparatus of claim 5, wherein the second connector is configured in accordance with a PC Card interface standard.

7. The coupling apparatus of claim 1, wherein the supply signal is a voltage signal.

8. The coupling apparatus of claim 1, wherein the supply signal provided over two or more predetermined contacts associated with the first connector.

9. The coupling apparatus of claim 8, wherein the supply signal is a time-varying signal.

10. A system comprising:
    a. a coupling apparatus for interconnecting a peripheral device and a host device, the coupling apparatus comprising:
       aa. a first connector configured for operative connection with the peripheral device via a first type of interface;
       ab. a second connector configured for operative connection with the host device via a second type of interface, different from the first type of interface; and
       ac. a coupling system operatively interconnecting the first connector and the second connector, the coupling system comprising processing components configured to generate a supply signal, the coupling system further configured to provide the supply signal to the peripheral device via the first connector, the supply signal indicative of presence of the coupling apparatus interconnecting the peripheral device and the host device, thereby indicating maximum supply power, maximum supply current, or both, available to the peripheral device from the host device, wherein generating the supply signal comprises monitoring conditions at one or more contacts of the second connector, processing said monitored condition using software or firmware installed on the processing components to generate the supply signal based on the conditions received at the one or more contacts of the second connector, and providing the supply signal based on the monitored conditions,
       wherein the first connector is configured for a mechanical connection with a peripheral device connector and the second connector is configured for a mechanical connection with a host device connector
    b. a peripheral device comprising:
       ba. a plurality of contacts, wherein one or more of said plurality of contacts are configured to receive the supply signal; and
       bb. a control system operatively associated with the connector, the control system configured to shift the peripheral device into an operating condition determined in accordance with the supply signal or in accordance with a detection of absence of the supply signal, the operating condition configured to limit power, current, or both, drawn by the peripheral device to less than or equal to the maximum supply power, maximum supply current, or both.

11. The system of claim 10, wherein the operating condition is selected from a plurality of operating conditions, wherein each operating condition uniquely corresponds to a particular supply signal.

12. The system of claim 10, further comprising a supply-voltage stabilization system configured to stabilize one or more supply voltages of the peripheral device and wherein the control system is configured to control power consumption of the supply-voltage stabilization system in accordance with the supply signal.

13. The system of claim 10, wherein the connector is configured in accordance with an ExpressCard interface standard.

14. The system according to claim 10, wherein the supply signal is received on an unused contact of the connector.

15. The system according to claim 10, wherein the supply signal is received over two or more contacts of the connector.

16. A method for controlling a peripheral device, the method comprising:
a. generating a supply signal on board a coupling apparatus, wherein the coupling apparatus comprises a first connector configured for operative connection with the peripheral device via a first type of interface, and a second connector configured for operative connection with a host device via a second type of interface different from the first type of interface, the supply signal indicative of presence of the coupling apparatus interconnecting the peripheral device and the host device, wherein generating the supply signal comprises monitoring conditions at one or more contacts of the second connector, processing said monitored conditions using software or firmware installed on processing components of the coupling apparatus to generate the supply signal based on the conditions received at the one or more contacts of the second connector, and providing the supply signal based on the monitored conditions,
wherein the first connector is configured for a mechanical connection to a peripheral device connector and the second connector is configured for a mechanical connection to a host device connector;
b. providing the supply signal to the peripheral device;
c. sensing the supply signal at a predetermined contact of a connector of the peripheral device, the supply signal indicative presence of the coupling apparatus interconnecting the peripheral device and the host device, thereby indicating maximum supply power, maximum supply current, or both, available to the peripheral device from the host device;
d. determining an operating condition in accordance with the supply signal of in accordance with the detection of absence of the supply signal, the operating condition configured to limit power, current, or both, drawn by the peripheral device to less than or equal to the maximum supply power, maximum supply current, or both; and
e. shifting the peripheral device into the operating condition.

17. The method of claim 16, wherein one of the one or more characteristics of power is available current.

* * * * *